(12) United States Patent
Lussey et al.

(10) Patent No.: US 9,546,859 B2
(45) Date of Patent: Jan. 17, 2017

(54) COMPOSITE MATERIAL

(75) Inventors: Christopher John Lussey, Brompton on Swale (GB); Paul Jonathan Laughlin, Brompton on Swale (GB); Adam Graham, Brompton on Swale (GB); David Bloor, Brompton on Swale (GB); David Lussey, Brompton on Swale (GB)

(73) Assignee: Peratech Holdco Limited, Richmond, North Yorkshire (GB)

( * ) Notice: Subject to any disclaimer, the term of this patent is extended or adjusted under 35 U.S.C. 154(b) by 419 days.

(21) Appl. No.: 14/007,232

(22) PCT Filed: Mar. 26, 2012

(86) PCT No.: PCT/GB2012/000260
§ 371 (c)(1),
(2), (4) Date: Oct. 11, 2013

(87) PCT Pub. No.: WO2012/131289
PCT Pub. Date: Oct. 4, 2012

(65) Prior Publication Data
US 2014/0109698 A1    Apr. 24, 2014

(30) Foreign Application Priority Data

Mar. 25, 2011  (GB) .................................. 1105025.9
Oct. 11, 2011  (GB) .................................. 1117492.7

(51) Int. Cl.
*H01B 1/00*     (2006.01)
*G01B 7/00*     (2006.01)
(Continued)

(52) U.S. Cl.
CPC ................. *G01B 7/003* (2013.01); *G01B 7/16* (2013.01); *G06F 3/045* (2013.01); *G06F 3/0414* (2013.01);
(Continued)

(58) Field of Classification Search
CPC ..... H01C 10/10; H01C 10/106; C09K 19/544; G03F 7/09; H01B 1/00
USPC ............ 252/500, 519.3; 73/862.62; 156/324; 427/77; 430/286.1
See application file for complete search history.

(56) References Cited

U.S. PATENT DOCUMENTS

| 4,745,301 A | 5/1988 | Michalchik |
| 2003/0124259 A1 | 7/2003 | Kodas et al. |

(Continued)

FOREIGN PATENT DOCUMENTS

| WO | WO-2005/017012 A1 | 2/2005 |
| WO | WO-2008/135787 A1 | 11/2008 |
| WO | WO-2009/086161 A1 | 7/2009 |

OTHER PUBLICATIONS

Martin, James E., et al., "Controlling percolation in field-structured particle composites: Observations of giant thermoresistance, piezoresistance, and chemiresistance," Physical Review B, vol. 67, No. 9, Mar. 2003.

(Continued)

*Primary Examiner* — Khanh Tuan Nguyen
(74) *Attorney, Agent, or Firm* — Arthur Jacob

(57) ABSTRACT

An electrically responsive composite material (1110) specially adapted for touch screen, comprising a carrier layer (1301) having a length and a width and a thickness (1303) that is relatively small compared to said length and said width. The composite material also comprises a plurality of electrically conductive or semi-conductive particles (201). The particles (201) are agglomerated to form a plurality of agglomerates (104, 1403) dispersed within the carrier layer such that each said agglomerate comprises a plurality of the particles (201). The agglomerates are arranged to provide electrical conduction across the thickness of the carrier layer in response to applied pressure such that the electrically responsive composite material has a resistance that reduces in response to applied pressure.

12 Claims, 15 Drawing Sheets

(51) Int. Cl.
*H01C 10/10* (2006.01)
*G06F 3/041* (2006.01)
*G06F 3/045* (2006.01)
*G01B 7/16* (2006.01)
*H01B 1/20* (2006.01)

(52) U.S. Cl.
CPC ................ *H01B 1/20* (2013.01); *H01C 10/10* (2013.01); *H01C 10/106* (2013.01); *Y10T 156/10* (2015.01); *Y10T 428/249921* (2015.04); *Y10T 428/268* (2015.01)

(56) References Cited

U.S. PATENT DOCUMENTS

| | | |
|---|---|---|
| 2005/0062024 A1 | 3/2005 | Bessette et al. |
| 2006/0043346 A1 | 3/2006 | Kodas et al. |
| 2010/0112481 A1* | 5/2010 | Kubota .................... G03F 7/09 430/286.1 |
| 2011/0175065 A1 | 7/2011 | de la Vega et al. |
| 2011/0253948 A1 | 10/2011 | Lussey et al. |
| 2011/0273085 A1 | 11/2011 | Garbar et al. |

OTHER PUBLICATIONS

International Preliminary Report on Patentability, Application No. PCT/GB2012/000260, Oct. 1, 2013.
International Search Report for PCT/GB2012/000260, ISA/EP, mailed Jan. 9, 2013.

* cited by examiner

COMPOSITE MATERIAL

CROSS REFERENCE TO RELATED APPLICATIONS

This application is a 371 U.S. National Stage of International Application No. PCT/GB2012/000260, filed Mar. 22, 2012, which claims priority from United Kingdom Patent Application No. 11 05 025.9, filed 25 Mar. 2011, and United Kingdom Patent Application No. 11 17 492.7, filed 11 Oct. 2011, the whole contents of which are incorporated herein by reference in their entirety.

BACKGROUND OF THE INVENTION

1. Field of the Invention

The present invention relates to an electrically responsive composite material, a position sensing device and a method of manufacturing a position sensing device. The invention also relates to a method of producing a composite material and a composite material comprising a liquid carrier and an electrically active solid filler material.

2. Description of the Related Art

User input devices are known that are substantially flat and are responsive to movement of a stylus or finger in an xy plane. In addition to this xy position detection, some devices of this type are also sensitive to pressure applied in the z dimension. Thus, when z dimension pressure detection is provided, it is possible for the input device to be provided with additional functionality.

It is also known for touch sensitive devices of this type to be combined with a display screen; the combination generally being referred to as a touch screen. The optical properties of a pressure responsive composition will usually be dominated by the nature of the electrically active filler particles and any further additives in the composition. It is therefore difficult to produce a transparent touch screen which is also capable of responding to applied pressure in the z dimension.

BRIEF SUMMARY OF THE INVENTION

According to a first aspect of the present invention, there is provided an electrically responsive composite material as claimed in claim 1.

Preferred features of the invention are as set out in the dependent claims. In one embodiment, the agglomerates comprise further particles formed of a dielectric material. In one embodiment, the dielectric particles comprise fumed silica, but other types of particles are used in other embodiments, formed of material that is conventionally considered to be dielectric material, such as titanium dioxide.

In preferred embodiments, the agglomerates comprise semi-conductive particles, and in one embodiment the semi-conductor particles are particles of tin oxide doped with antimony. However, in other such embodiments, the particles are formed of other semi-conducting material, such as indium tin oxide, zinc oxide, carbon or they are mixtures of such particles.

In some embodiments, the agglomerates comprise conductive particles, which may be formed of any solid metal or conductive metal oxide. For example, in one such embodiment, the conductive particles are particles silver. In other such embodiments, the conductive particles are formed of alternative metals, such as nickel, or a mixture of metal types.

In a preferred embodiment a first plurality of said agglomerates have a first dimension in the direction of thickness that is equal to or greater than the thickness of the carrier layer.

In accordance with the present invention there is also a position sensing device comprising: the electrically responsive composite material of claim 1; a first conductive layer that is electrically conductive along said layer; and a second conductive layer that is electrically conductive along said layer; wherein the agglomerates are arranged to provide conduction between said first conductive layer and said second conductive layer.

The loading and dispersive nature of the filler material can result in the filler having negligible effect on the optical properties of the composite. Therefore the optical properties of the composite can be varied from opaque to translucent to transparent, and can be matched to the desired optical properties of an end use device incorporating the composite material.

DETAILED DESCRIPTION OF EXAMPLE EMBODIMENTS

FIG. 1

Figure 1:
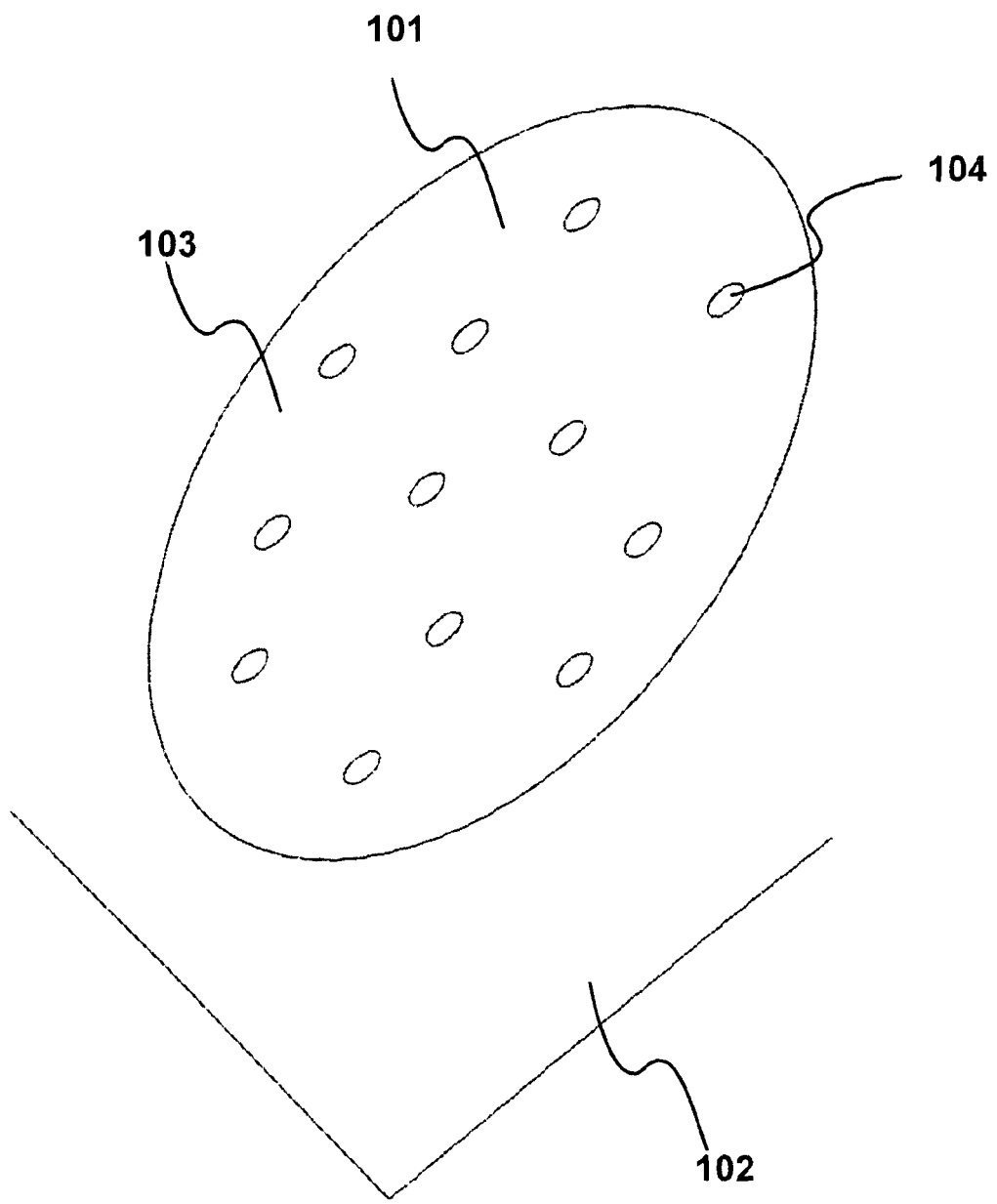
FIG. 1 shows an electrically responsive composite material.

An electrically responsive composite material 101 is shown in FIG. 1 which has been applied to a substrate 102. The material comprises electrically active filler particles dispersed in a polymer binder 103 that can be cross-linkable, solvent-based, thermally or uv-curable. Through controlled blending of the composition the filler material is in the form of dispersed agglomerates, each agglomerate consisting of a plurality of filler particles. After application onto a suitable substrate, cross-linking, solvent evaporation, thermal or uv curing will leave a dispersion of agglomerates 104 in the remaining polymer.

Examples of blending processes for mixing the filler material into a liquid carrier will be described in detail below. In each case, the required agglomeration of the smaller particles is achieved by careful control of the blending process. However, it may also be noted that the mixture is kept substantially free from surfactants (or wetting agents) which, if present, would assist the dispersion of the smaller particles within the liquid polymer binder and prevent the required agglomeration. That is, the mixture is either absolutely free of surfactants, or surfactants are present in such low concentrations as to have no appreciable effect on the mixing process.

FIG. 2

Figure 2:
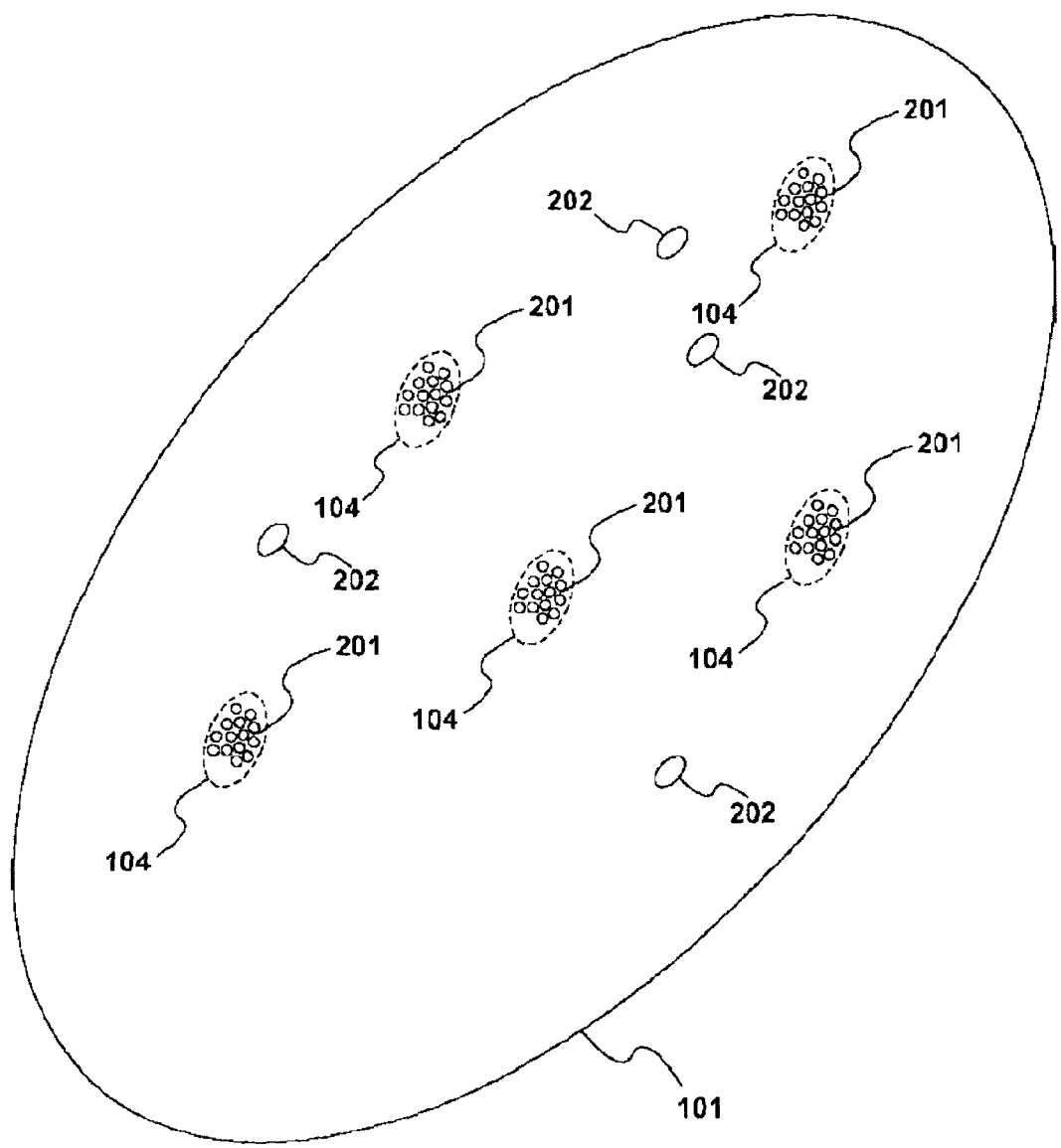
FIG. 2 illustrates agglomerates of the type identified in FIG. 1.

Agglomerates 104 are shown in FIG. 2, made up of smaller particles 201. The polymer binder 101 may be opaque, translucent, or substantially transparent and remains such after cross-linking, solvent evaporation or curing. The size and dispersion of the agglomerates (shown enlarged greatly in FIG. 2) is such as to render them invisible to an unaided eye. Thus, the size of the agglomerates is such that a thin coating of the electrically responsive composite material appears optically substantially the same as without the addition of the filler particles. In order for the agglomerates to be invisible, or virtually invisible, to the unaided eye, the largest dimension of the agglomerates is kept below 40 micrometers. However, in preferred embodiments, the largest dimension of the agglomerates is between 5 and 15 micrometers.

Furthermore, the agglomerates are dispersed such that they occupy a very small area of the xy plane and are only visible after magnification.

In an embodiment, the smaller particles 201 are particles of tin oxide doped with antimony. These could be spherical, or could be shaped to modify the electrical and mechanical properties of the composite. For example, acicular shaped smaller particles will affect agglomeration and promote field-assisted electron tunnelling to increase the electrical sensitivity of the composition to applied pressure. In some alternative embodiments, the smaller particles are a mixture of spherical particles and acicular particles (i.e. needle shaped particles having an aspect ratio of greater than 1:1), each of said smaller particles being formed of an electrically conducting or semi-conducting material. By selecting a particular ratio of spherical to acicular particle types allows the pressure sensitivity of the final product to be chosen.

In a further alternative embodiment, the smaller particles are in the form of preformed granules, for example but not limited to those described in WO 99/38173. Such granules comprise electrically active particles coated with very thin layers of polymer binder. The relative amount of filler to binder in such granules can be varied to alter the electrical response of the granules from essentially conducting (ratio of filler to binder in the granules high) to essentially insulating (ratio of filler to binder in the granules low). Inclusion of such granules as electrically active filler in the form of agglomerates in the composition will affect the electrical properties of the composition.

In an alternative embodiment, the composite material may also include a dielectric filler, illustrated as particle 202. The dielectric filler particles 202 may be fumed silica or other dielectric particles. The addition of dielectric particles can be by small amounts to maintain the optical properties of the composite, or can be by larger amounts to modify the optical properties. The addition of dielectric particles can also allow the resistance-force response to be modified.

In an alternative embodiment, it is possible to include a conductive material as the binder within the composite material such that when arranged to define a planar construction having planar xy dimensions and a relatively thin dimension, the conductive material itself facilitates electrical conduction in the defined xy plane while the agglomerates allow conduction substantially normal to the plane in the z direction to a degree that is dependent upon the level of applied pressure. In an embodiment, it is possible for the conductive material to be an inherently conductive polymer. The conductive polymer could be, for example, Poly(3,4-ethylenedioxythiophene) poly(styrenesulfonate) (PEDOT/PSS). Alternatively, the conductive material could be a percolative composition. This percolative composition could take the form of a dispersion of metallic or carbon nanowire particles.

FIG. 3

Figure 3:
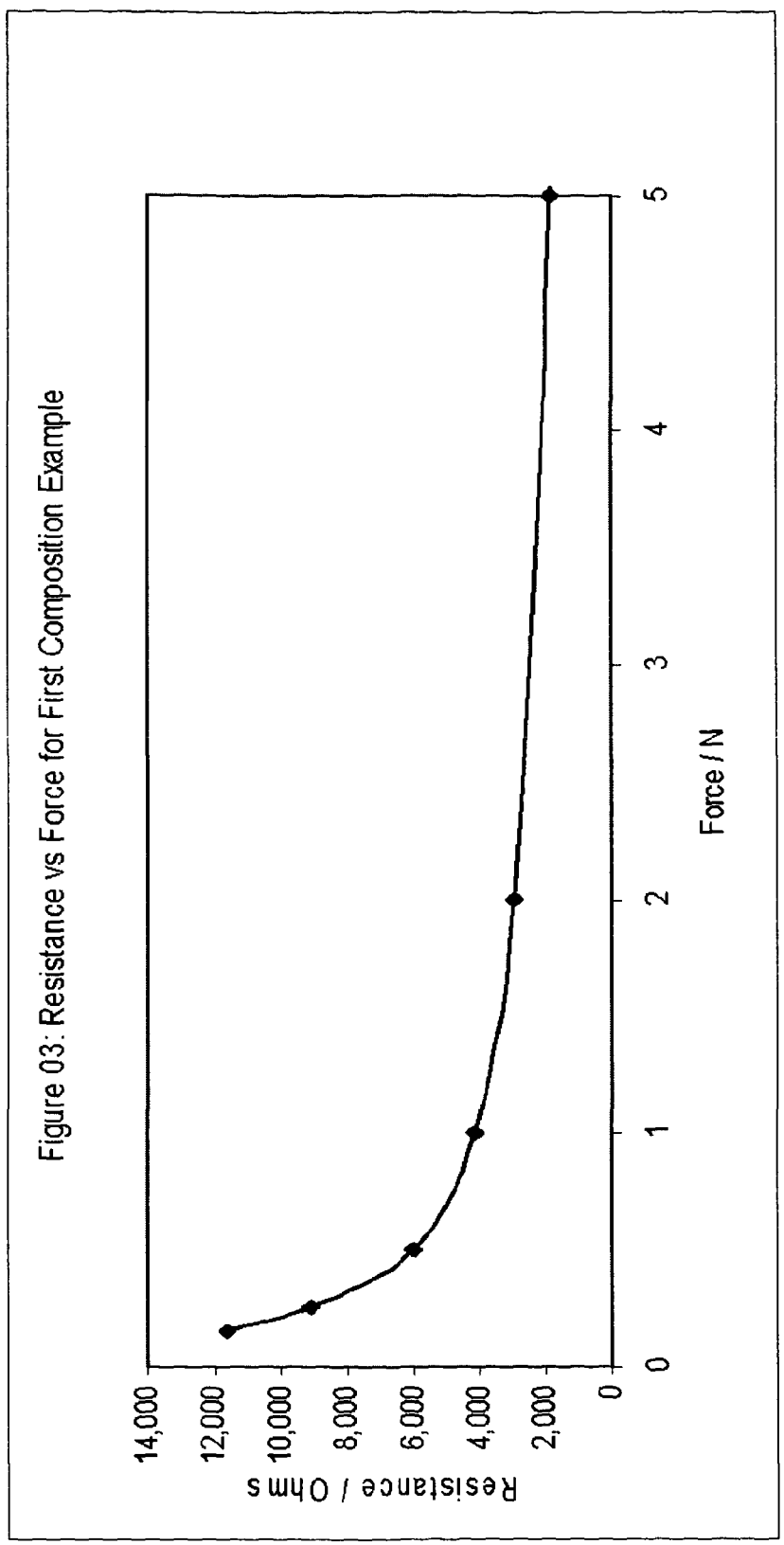
FIG. 3 is a graphic representation showing the resistance plotted against force for a first composition sample according to this invention.

FIG. 3 is a graphical representation showing resistance plotted against force for a first composition sample, formulated as follows:

50 g Sericol VA401 APR Varnish (a varnish comprising a mixture of acrylic and polyvinyl resins and organic solvent) was decanted into a container. 10 g Sericol Type ZV558 solvent was then added. The mixture was blended using a SpeedMixer™ DAC 150.1 FVZ Dual Asymmetric Centrifugal Laboratory Mixer System supplied by Synergy Devices Limited at 3500 rpm for 2 mins. Then added to this mixture was 0.1 g electroconductive powder type SN100P supplied by Ishihara Corporation. SN100P is antimony-doped tin oxide powder, spherical in shape, with average particle size of approximately 0.02 micron. The formulation was mixed in the SpeedMixer™ for a further 2 mins at 3500 rpm.

The formulation was screen printed onto an ITO-coated Polyethylene terephthalate) (PET) sheet. Solvent evaporation was achieved at 90° C. for 0.5 hrs. Scanning Electron Microscope (SEM) analysis showed that the filler particles were dispersed in the form of agglomerates with size ranging from 1 to 10 micron approximately. Transparency of the assembly was measured to be approximately 98% of the transparency value of the ITO alone. For testing a second ITO-coated PET sheet was used as top electrode.

The resistance-force response of the assembly was measured using an Instron Model 5543 Single Column Testing System, with a 500 Newton (N) load cell. An 8 mm diameter rubber probe was attached to the load cell to apply an increasing force of 0N to 5N to the assembly, a force range typically used in application of devices.

It can be seen from FIG. 3 that the resistance of the assembly changed gradually from approximately 12,000 Ohms to 1,700 Ohms as the force applied increased from 0N to 5N.

Similar resistance-force responses were measured for different amounts of SN100P addition. Additions of SN100P between 0.05 g and 1 g in the polymer/solvent solution described above were investigated. The effect of increasing the loading of SN100P was to make the assembly operate at lower resistance values, and to effect a decrease in the transparency of the assembly. Thus, ratios of up to about 50:1 and down to about 1000:1 (weight/weight) varnish to filler material were found to be useable. However, in preferred embodiments, the ratio of varnish to filler material was at least 100:1 and in still further preferred embodiments, in order to optimise the transparency while providing good electrical properties, the ratio was between 200:1 and 1000:1.

In a variant of the above described mixing method the powder is premixed with solvent before adding to the varnish. In an example, 0.1 g of electroconductive powder is added to 5 grams of solvent within a container. This mixture was then blended using the Dual Asymmetric Centrifugal Laboratory Mixer System at 3500 rpm for 2 mins. The blended mixture is then added to 50 g of the Sericol VA401 APR Varnish and the mixture of varnish solvent and particles is then blended in the mixer at 3500 rpm for 2 mins.

Thus, in each of these embodiments, the polymer binder is a mixture comprising one or more polymers and one or more solvents, such that the solvents evaporate to leave a solidified polymer layer. However, in alternative embodiments, the binder may be a substance that is capable of polymerisation to provide a solidified polymer layer. For example, in one such embodiment, the binder is a UV-curable resin.

FIG. 4

Figure 4:
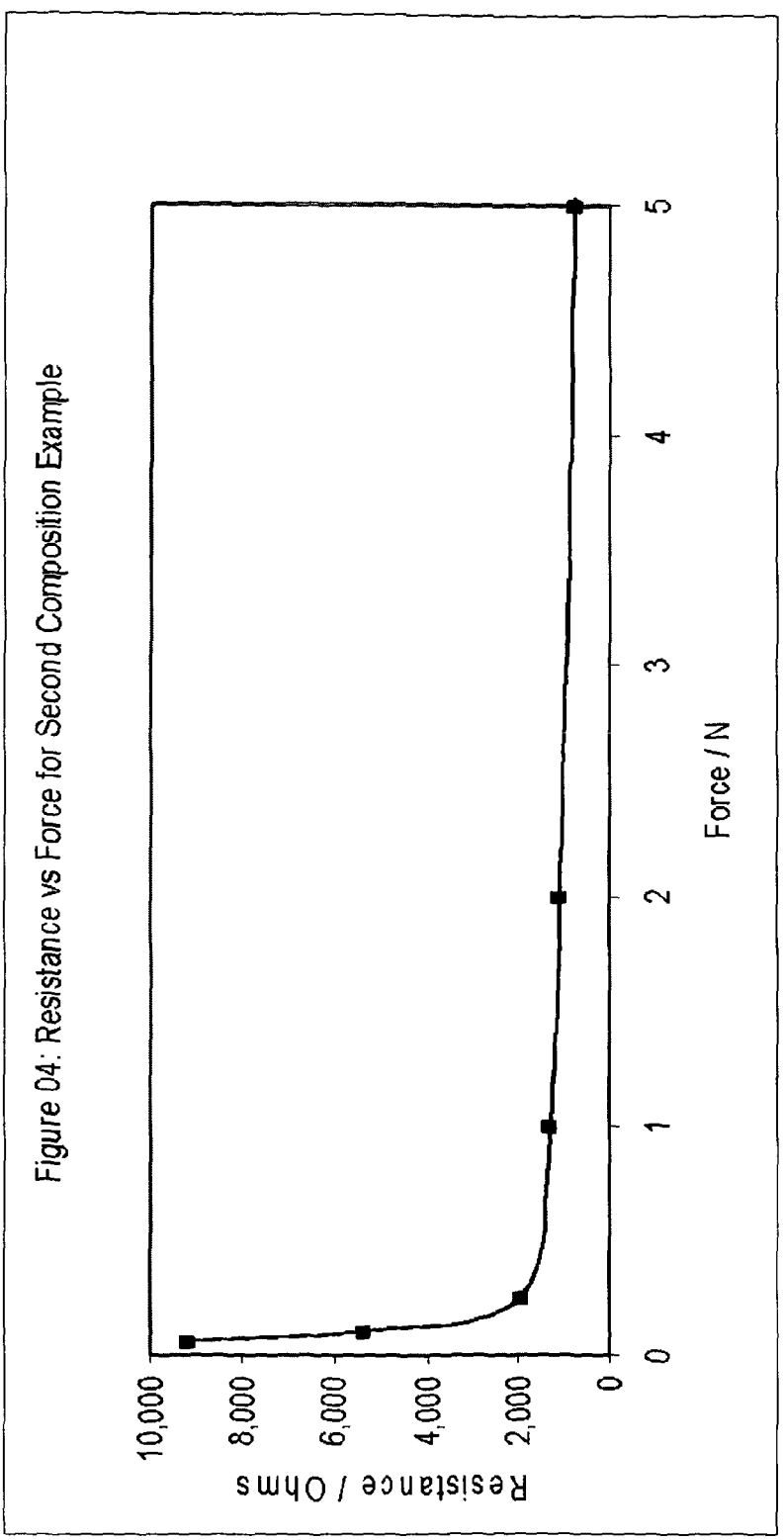
FIG. 4 is a graphic representation showing the resistance plotted against force for a second composition sample according to this invention.

FIG. 4 is a graphical representation showing resistance plotted against force for a second composition sample, formulated as follows:

50 g Sericol VA401 APR Varnish was decanted into a container. 10 g Sericol Type ZV558 solvent was then added. The mixture was blended using a SpeedMixer™ DAC 150.1 FVZ Dual Asymmetric Centrifugal Laboratory Mixer System supplied by Synergy Devices Limited at 3500 rpm for 2 mins. Then added to this mixture was 0.1 g electroconductive powder type FS10P supplied by Ishihara Corporation. FS10P is antimony-doped tin oxide powder, acicular in shape, with length of 0.2 to 2.0 micron and diameter 0.01 to 0.02 micron. The aspect ratio varies from 20 to 30 approximately. The formulation was mixed in the SpeedMixer™ for a further 2 mins at 3500 rpm.

The formulation was screen printed onto an ITO-coated Poly(ethylene terephthalate) (PET) sheet. Solvent evaporation was achieved at 90° C. for 0.5 hrs. Scanning Electron Microscope (SEM) analysis showed that the filler particles were again dispersed in the form of agglomerates. For testing a second ITO-coated PET sheet was used as top electrode.

The resistance-force response of the assembly was measured as described for Composition 1 of FIG. 3.

It can be seen from FIG. 4 that the resistance of the assembly changed from approximately 10,000 Ohms to 750 Ohms as the force applied increased from 0N to 5N.

The response at low force is more rapid than that observed for Composition 1 of FIG. 3. This is attributed to differences in agglomeration due to the different particle shape, and facilitation of field-assisted electron tunnelling from the tips of the acicular particles.

FIG. 5

Figure 5:
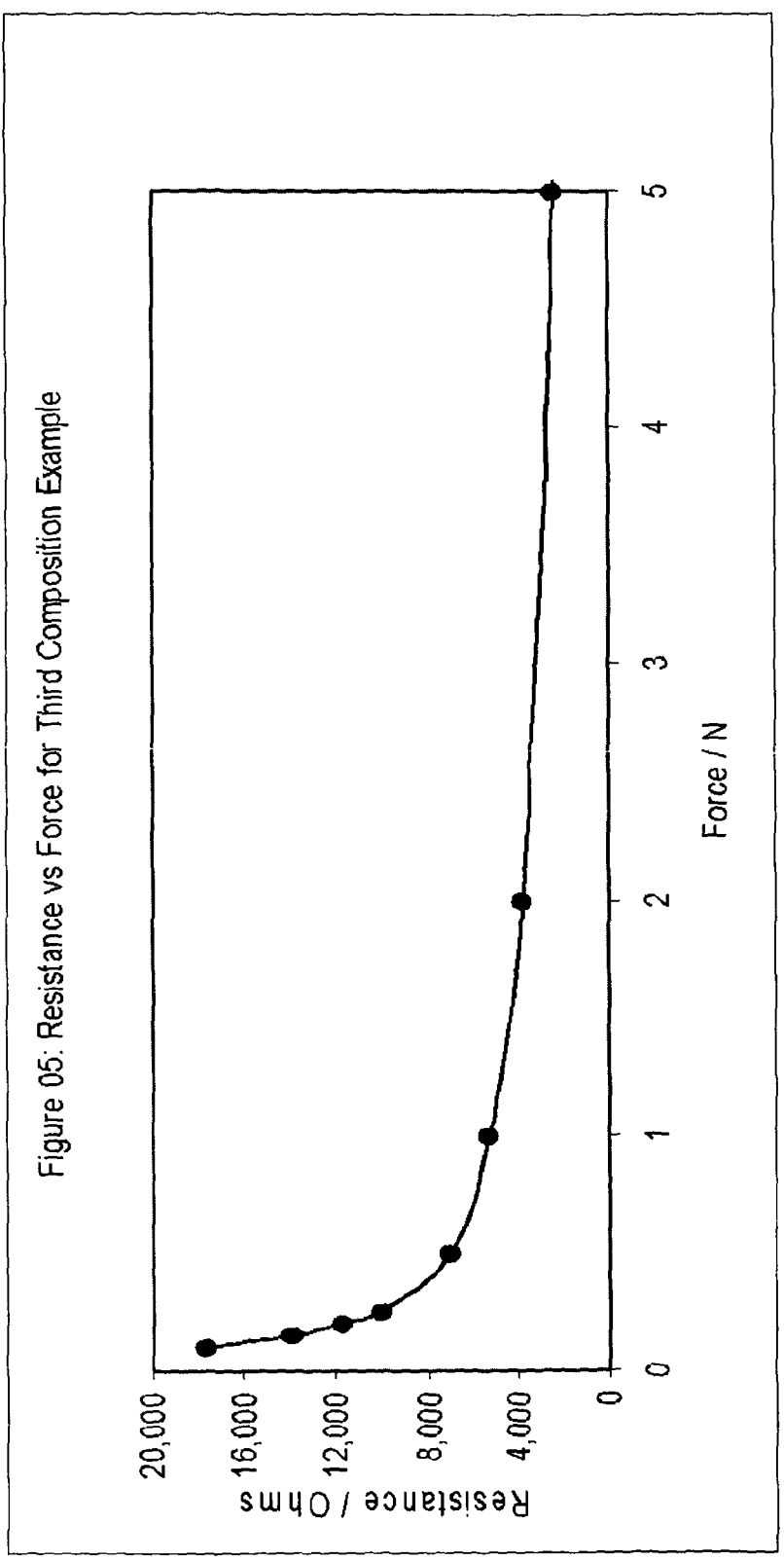
FIG. 5 is a graphic representation showing the resistance plotted against force for a third composition sample according to this invention.

FIG. 5 is a graphical representation showing resistance plotted against force for a third composition sample, formulated as follows:

50 g Sericol VA401 APR Varnish was decanted into a container. 10 g Sericol Type ZV558 solvent was then added. The mixture was blended using a SpeedMixer™ DAC 150.1 FVZ Dual Asymmetric Centrifugal Laboratory Mixer System supplied by Synergy Devices Limited at 3500 rpm for 2 mins. Then added to this mixture was 0.1 g electroconductive spherical powder type SN100P supplied by Ishihara Corporation. The formulation was mixed in the SpeedMixer™ for a further 2 mins at 3500 rpm. A further addition of 0.1 g Aerosil™ Type R972 fumed silica (average particle size of 16 nanometers) was added to the formulation, and blended in the SpeedMixer™ at 3500 rpm for 2 mins.

The formulation was screen printed onto an ITO-coated Poly (ethylene terephthalate) (PET) sheet. Solvent evaporation was achieved at 90° C. for 0.5 hrs. For testing a second ITO-coated PET sheet was used as top electrode.

The resistance-force response of the assembly was measured as described for Composition 1 of FIG. 3.

It can be seen from FIG. 5 that the resistance of the assembly changed gradually from approximately 18,000 Ohms to 2,400 Ohms as the force applied increased from 0N to 5N.

A reduction in sensitivity to applied force is seen in Composition 3 compared to the response of Composition 1 of FIG. 3. This reduction in sensitivity is believed to be due to the presence of the fumed silica particles, whose inclusion can also improve the durability of the composition to repeated applications of force.

FIG. 6

Figure 6:
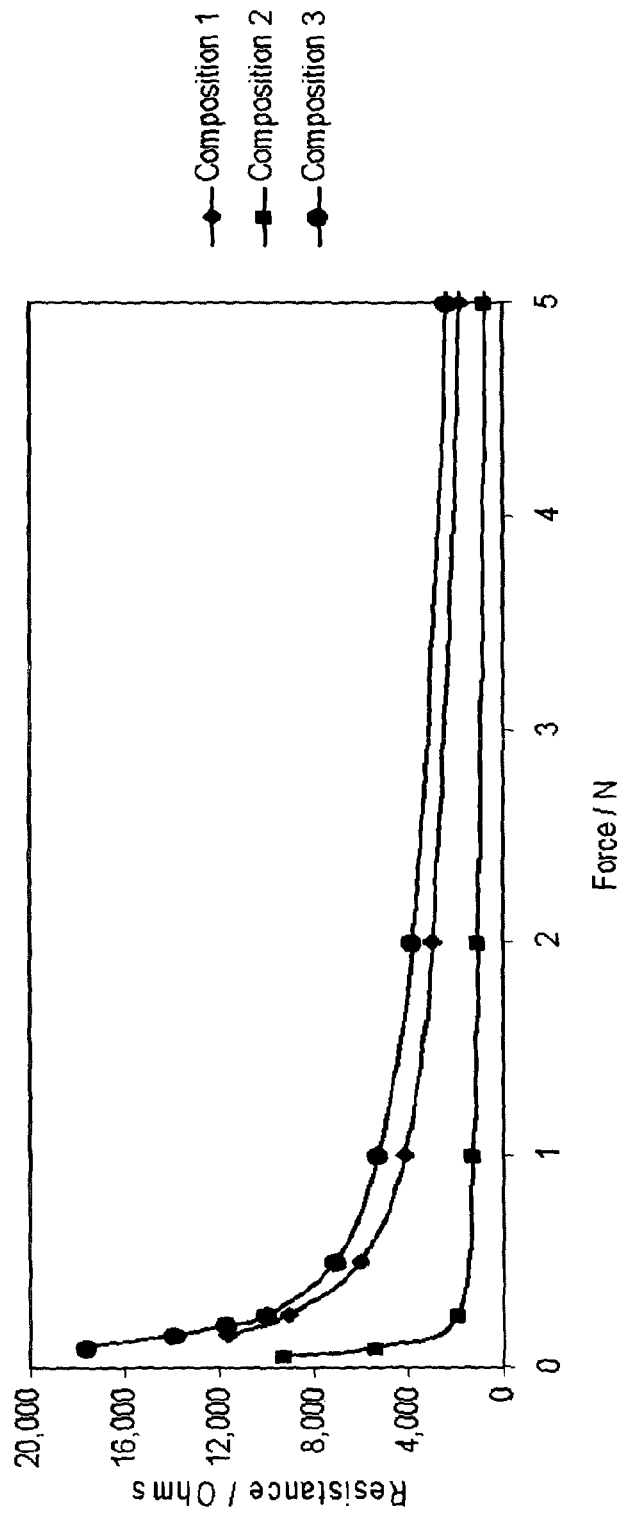
FIG. 6 compares the resistance-force response of Composition Examples 1, 2 and 3.

Comparisons between the resistance-force response of Example Compositions 1, 2 and 3 are shown in FIG. 6.

FIG. 7

Figure 7:
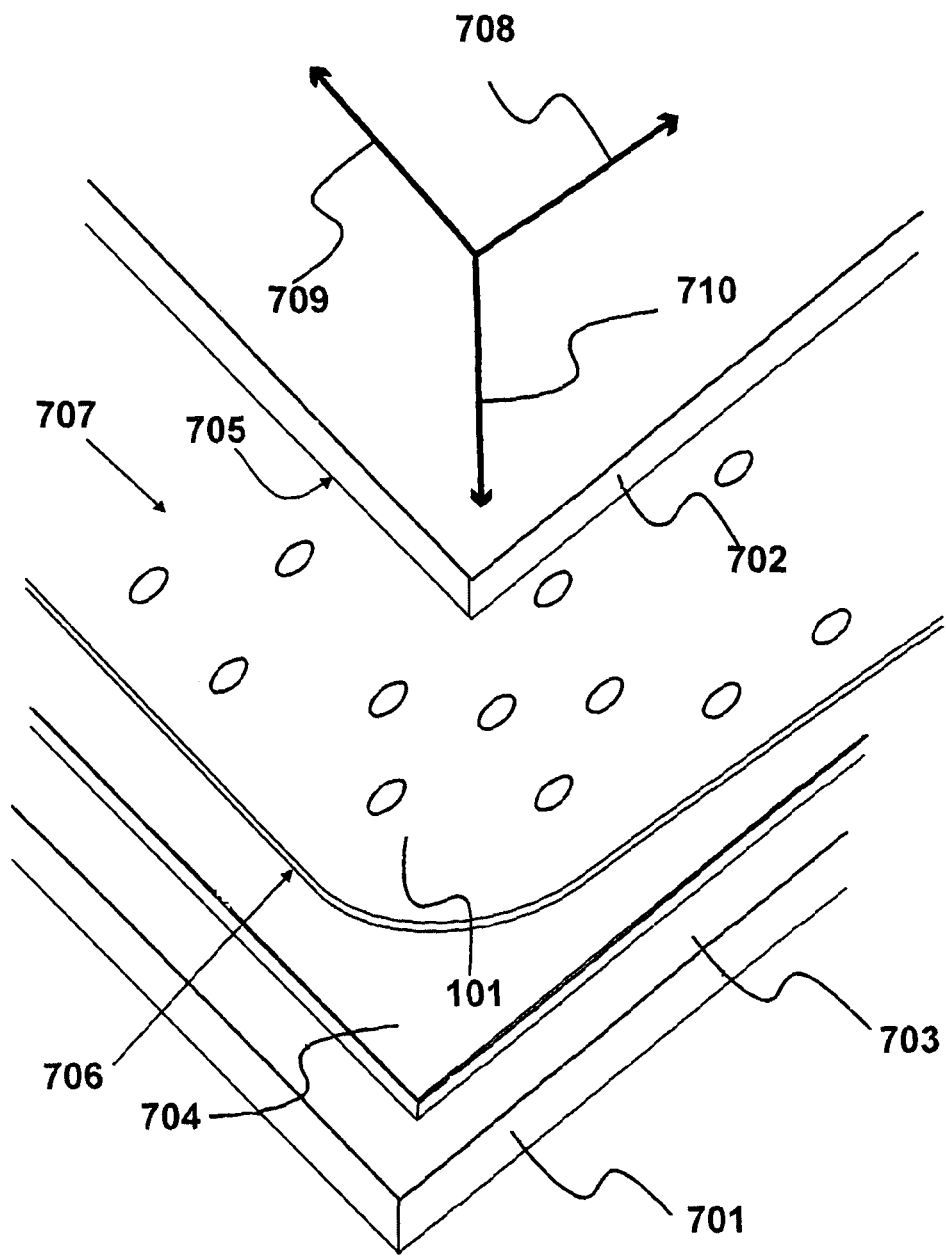
FIG. 7 illustrates a touch screen fabrication.

A touch screen fabrication is shown in FIG. 7. A first transparent substrate 701 is provided along with a second substantially transparent substrate 702. Substrates 701 and 702 could be fabricated in a glass or plastics material for example. The first substrate 701 has an upper surface 703 and a conductive layer 704 is applied to this upper surface 703. The conductive layer 704 may be constructed from indium tin oxide. A similar conductive layer is applied to the underside 705 of the second substrate 702. Between these conductive layers, the composite material 101 is defined as a planar layer having a first planar surface 706 and a second planar surface 707. The composite material is deposited onto conductive layer 704 by, for example, screen printing. Solvent removal or curing is achieved through heat or uv treatment.

When sandwiched together, the conductive layers attached to the upper surface 703 and underside 705, on respective substrates 701 and 702, allow position detection to be made in the x dimension 708 and in the y dimension 709. Furthermore, the inclusion of the composite material 101 facilitates pressure detection to be possible in the z dimension 710.

FIG. 8

Figure 8:
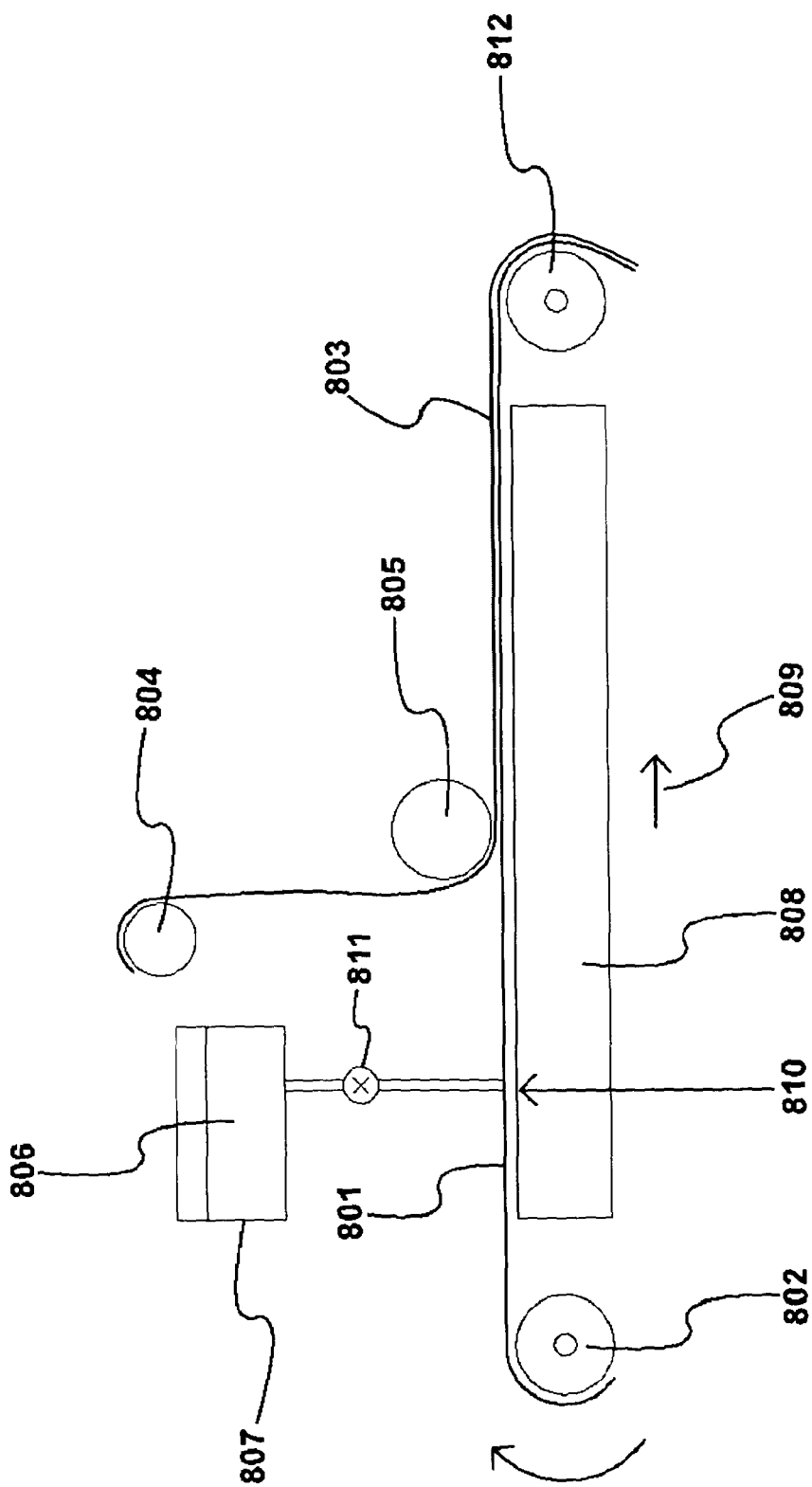
FIG. 8 illustrates a roll-to-roll process.

A roll-to-roll process is illustrated in FIG. 8. A first conductive layer 801 is received from a first supply reel 802. A second conductive layer 803 is received from a second supply reel 804 and is supported by a roller 805.

Composite material 806 is retained in liquid form within a supply hopper 807.

The first conductive material is pulled from its supply reel 802 and is supported by a base unit 808. As the material traverses along the base unit in the direction of arrow 809, composite material in liquid form is received at 810, under the control of a motorised valve 811.

Roller 805 applies the second conductive material above the composite material which, in an embodiment will have been heated or uv-treated so as to effect evaporation of the solvent or curing before the composition is encapsulated by the second conductive layer 803. The three layer laminate is then received by reception reel 812.

The roll-to-roll process illustrated in FIG. 4 facilitates a method of producing a device incorporating the electrically responsive composite material, wherein the composite material is constrained within conductive layers to produce a laminate.

FIG. 9

Figure 9:
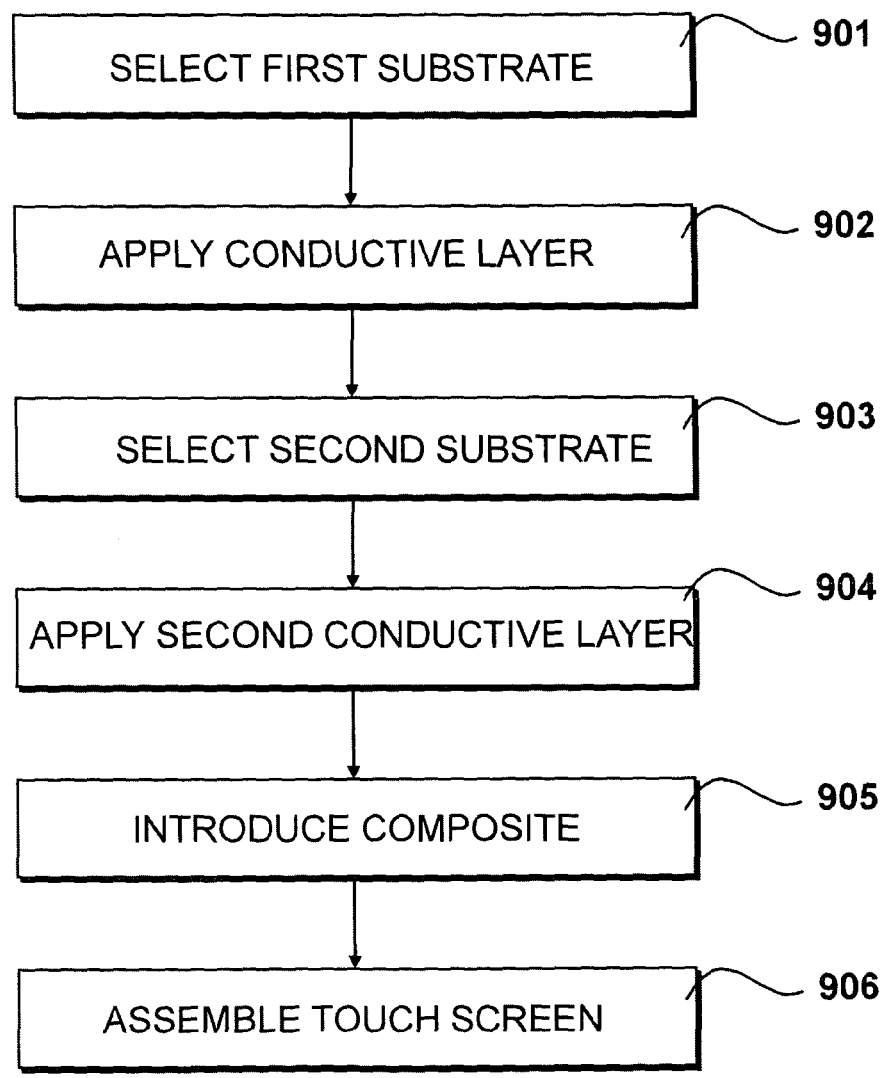
FIG. 9 identifies a manufacturing method.

In an embodiment, the composite material is used in a method of manufacturing a pressure sensitive and substantially transparent touch screen, as illustrated in FIG. 9.

At step 901, a first substrate is selected and at step 902 a first conductive layer is applied to an internal surface of the first substrate.

At step 903 a second substrate is selected and again at step 904 a second conductive layer is applied to an internal surface of the second substrate. Consequently, a contact location between the first conductive layer and the second conductive layer allows a position of contact to be determined.

At step 905 a composite material of the type previously described is introduced between the first conductive layer and the second conductive layer. The composite material has a resistance that reduces in response to applied pressure such that in addition to identifying xy locations within the plane, it is also possible to determine the degree of pressure applied in the z dimension.

FIG. 10

For some years, display screens have been used in electronic devices, such as mobile cellular telephones, gaming devices, still cameras and video cameras. Recently, there has been a move towards providing touch screens in which the output interface and the input interface are effectively combined. In this way, as is well known, it is possible to present a larger interface and therefore achieve greater levels of functionality.

The present invention allows these ideas to be developed further in that it becomes possible to achieve touch sensitivity upon a touch screen whose optical properties are essentially independent of the electrically active filler material, and may be transparent.

Figure 10:
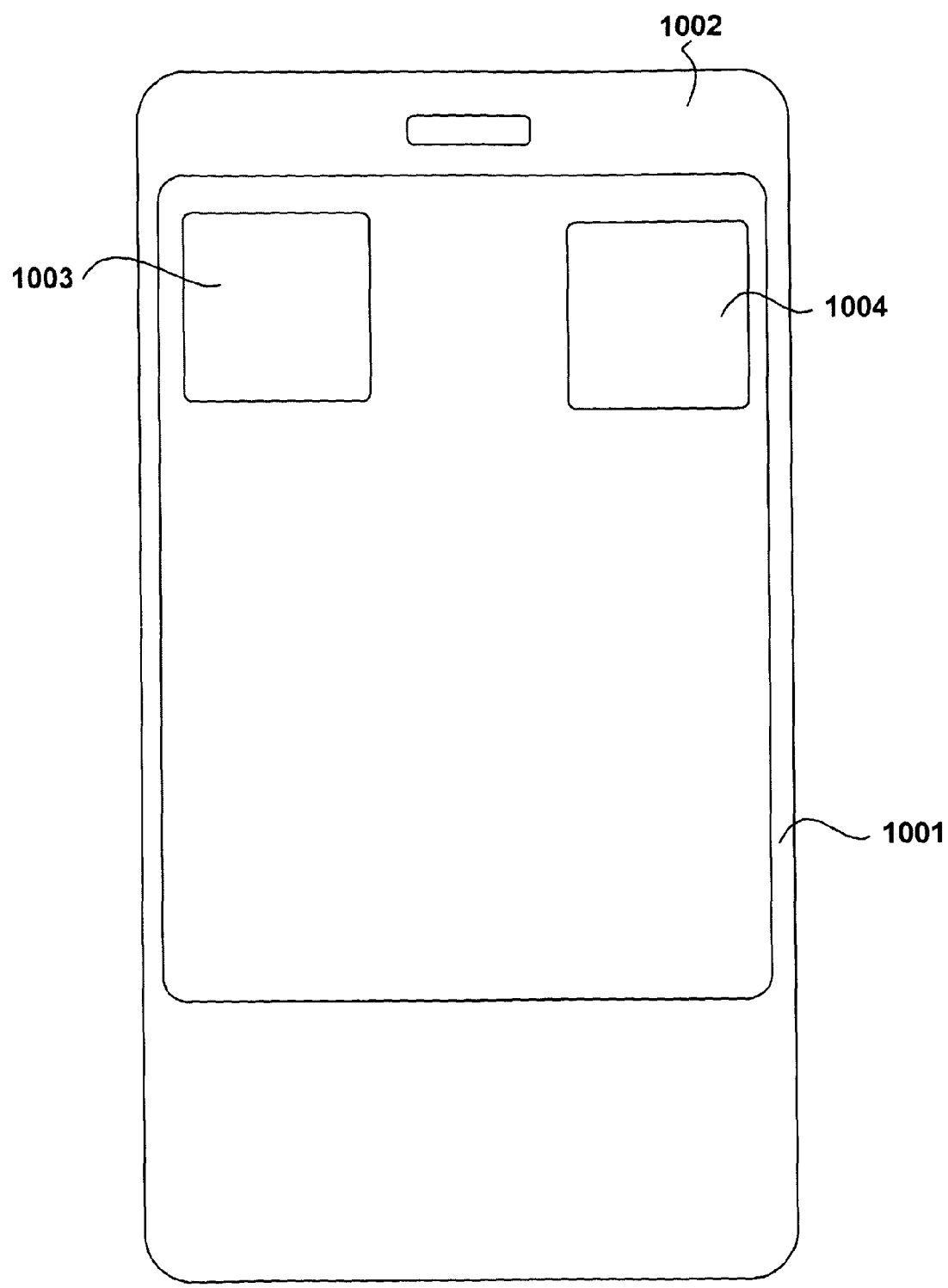
FIG. 10 illustrates a device having a display screen.

An electronic device 1001 is shown in FIG. 10. The device has a relatively large touch screen 1002. Soft buttons 1003, 1004 are included, the activation of which may be determined by identifying a position of contact. Furthermore, other parameters may be controlled by measuring the extent to which these buttons are depressed while at the same time retaining the visual display characteristics through the transparent screen.

Figure 11:
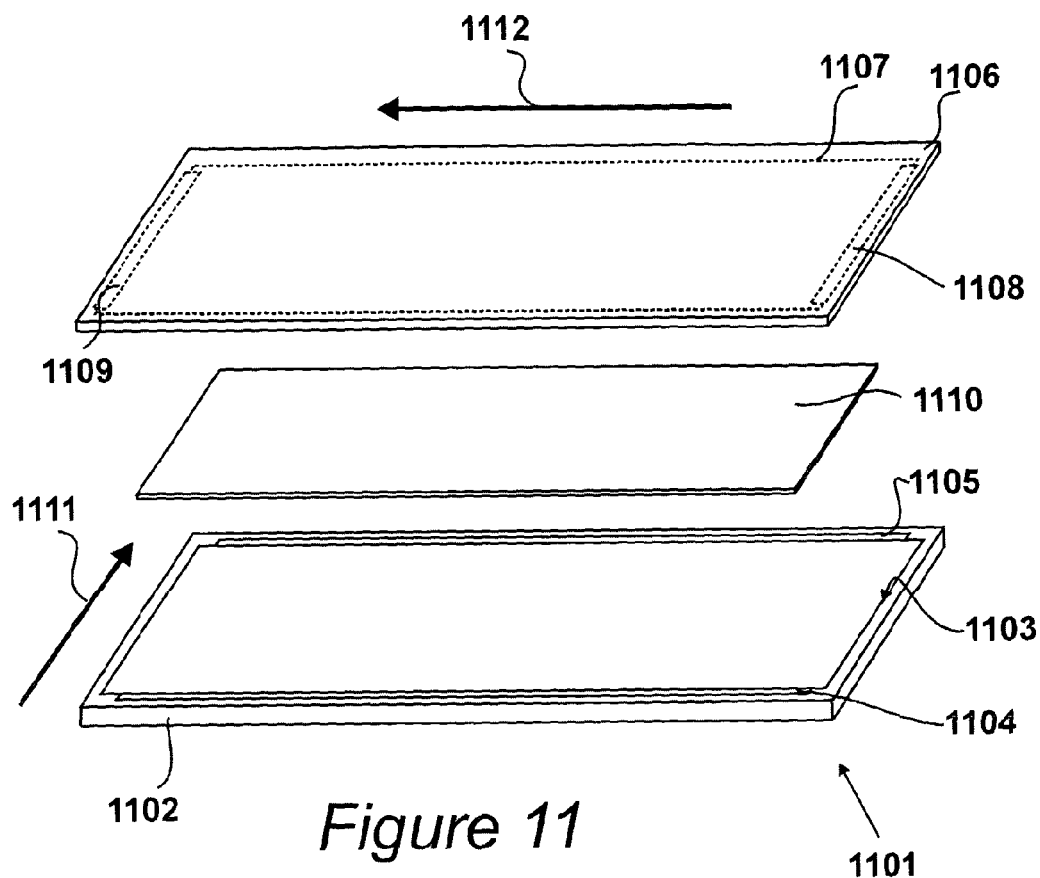
FIG. 11 shows an exploded view of a position sensing device 1101.
Figure 12:
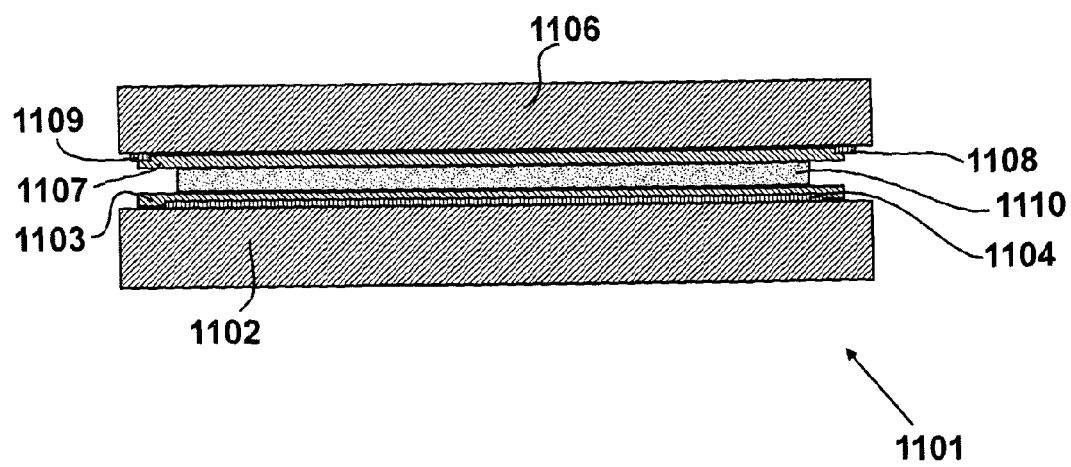
FIG. 12 shows a cross-sectional view of the position sensing device 1101.

FIGS. 11 and 12

A position sensing device 1101 is shown in an exploded view in FIG. 11 and in a cross-sectional view in FIG. 12. The cross-sectional view of FIG. 12 has been greatly stretched in the direction of its height such that the various layers may be clearly seen. However, it should be understood that, in reality, the inner layers are all microscopically thin.

The position sensing device 1101 comprises a lower electrically insulating sheet 1102, formed of poly (ethylene terephthalate) (PET) on to which an indium tin oxide (ITO) conductive layer has been applied. The first conductive layer 1103 is substantially rectangular in shape and has a highly conductive strip of material 1104, 1105 arranged along each one of two opposing sides of the rectangle.

The position sensing device 1101 comprises a second sheet of electrically insulating material 1106 (also formed of PET) that has been similarly coated with ITO to form a second electrically conductive layer 1107 and a pair of highly conductive strips 1108 and 1109 arranged along opposing edges of the second conductive layer 1107. The second pair of conductive strips 1108 and 1109 are arranged to extend substantially perpendicular to the first set of conductive strips 1104 and 1105. A layer of electrically responsive composite material 1110 is arranged between the two electrically conductive layers 1103 and 1107.

The electrically conductive layer may be formed in accordance with one of the above described methods that make reference to FIGS. 3, 4 and 5.

Typically, during operation, an electrically potential is applied to the first conductive strips 1104 and 1105 to produce a potential gradient in a first x direction, indicated by arrow 1111, while voltage measurements are made of the electrical potential appearing at one or both of the second pair of conductive strips 1108 and 1109. Thus, if a force is applied to the upper surface of the upper sheet 1106 and x-coordinate of the potion of the applied force may be determined. Similarly, an electrical potential is applied between the second conductive strips 1108 and 1109 to produce an electrical potential gradient across the second electrically conducting layer 1107 in a second y direction shown by arrow 1112. The electrical potential appearing at one or both of the first pair of conductive strips 1104 and 1105 is then measured to determine the y coordinate of any force that is applied to the upper sheet 1107.

It should be noted that the electrically responsive composite material 1110 provides conduction between the first and second conductive layers 1103 and 1107 at locations where pressure is applied to it. Furthermore, as discussed above, the resistance of the electrically responsive composite material 1110 continuously reduces as applied pressure increases. Consequently, by taking measurements of current through the layer 1110 an indication of the applied pressure can be measured. A similar arrangement of layers and electrodes (provided by conductive strips 1104, 1105, 1108 and 1109) is described in the applicants earlier patent application published as GB 2468870A, which also discusses the electrical measurements in detail. However, the position sensor 1101 differs from earlier position sensors, including those of GB 2468870A, in the specific details of the electrically responsive composite material layer 1110.

It may be noted that, in the present embodiment, each of the sheets 1102 and 1106, the conductive layers 1103 and 1107 and the electrically responsive composite material layer 1110 are substantially transparent or see-through such that the position sensor 1101 maybe used as the pressure sensitive position sensor of a touch screen, such as touch screen 1102 of FIG. 10. However, in alternative embodiments one or more of the sheets or layers may be opaque and the position sensing device 1101 is used as a separate x, y, z input device.

FIG. 13

Figure 13:
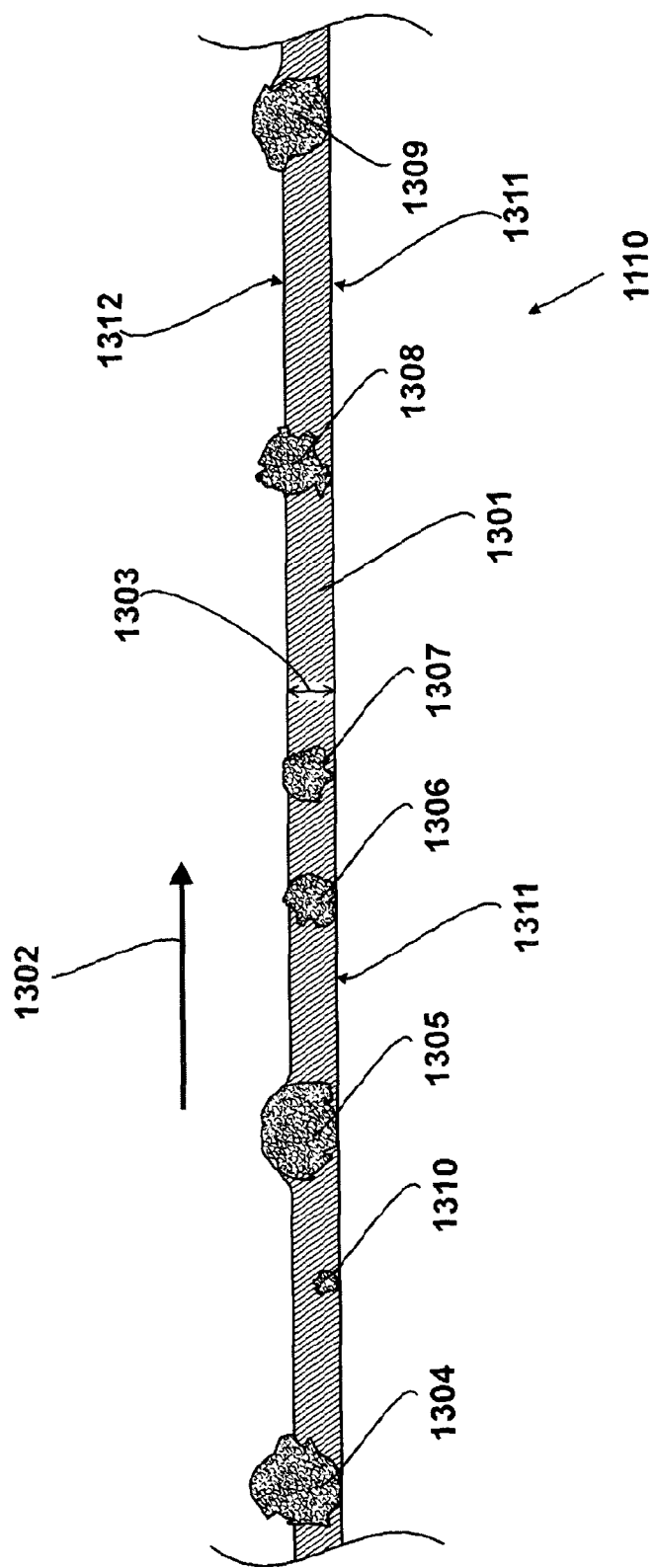
FIG. 13 shows a small section of the electrically responsive composite material layer 1110, in cross-section.

A small section of the electrically responsive composite material layer 1110 is shown in cross section in FIG. 13. The electrically response composite material layer 1110 comprises a carrier layer 1301 that, in the present embodiment, is electrically insulating.

The carrier layer 1301 typically has a length, in direction of 1302, and a width (extending out of the page in FIG. 13) of several centimeters. In contrast, the carrier layer 1301 has a thickness in direction of arrow 1303 that is relatively thin, typically being less then 10 micro meters, and in the present example is approximately six micrometers.

The electrically responsive composite material 1110 also comprises a plurality of electrically conductive, or semi-conductive, particles. These particles are agglomerated to form a plurality of agglomerates disbursed within the carrier layer 1110. That is, each of the agglomerates comprises a plurality of the conductive or semi-conductive particles. Seven of the agglomerates 1304, 1305, 1306, 1307, 1308, 1309 and 1310 are illustrated in FIG. 13 dispersed within the carrier layer 1301.

The electrically responsive composite material 1110 is formed by applying (such as by screen printing) a liquid formulation on to a flat planar substrate. Consequently, a lower face 1311 of the composite material 1110 is substantially flat. However, a first plurality of the agglomerates each have a first dimension, in the direction of the thickness 1303 of the carrier layer 1301, that is greater than the thickness of the carrier layer. Consequently, a first plurality of agglomerates 1304, 1305, 1306, 1307, 1308 and 1309 extend outwards from the otherwise generally flat upper surface 1312 of the carrier layer 1301. It is this first plurality of agglomerates that may be employed to provide a conductive path through the thickness of the composite material 1110 during operation of the position sensor 1101. In contrast, agglomerates such as agglomerate 1310 that are completely immersed within the carrier layer 1301 are unable to provide a conductive path.

FIG. 14

Figure 14:
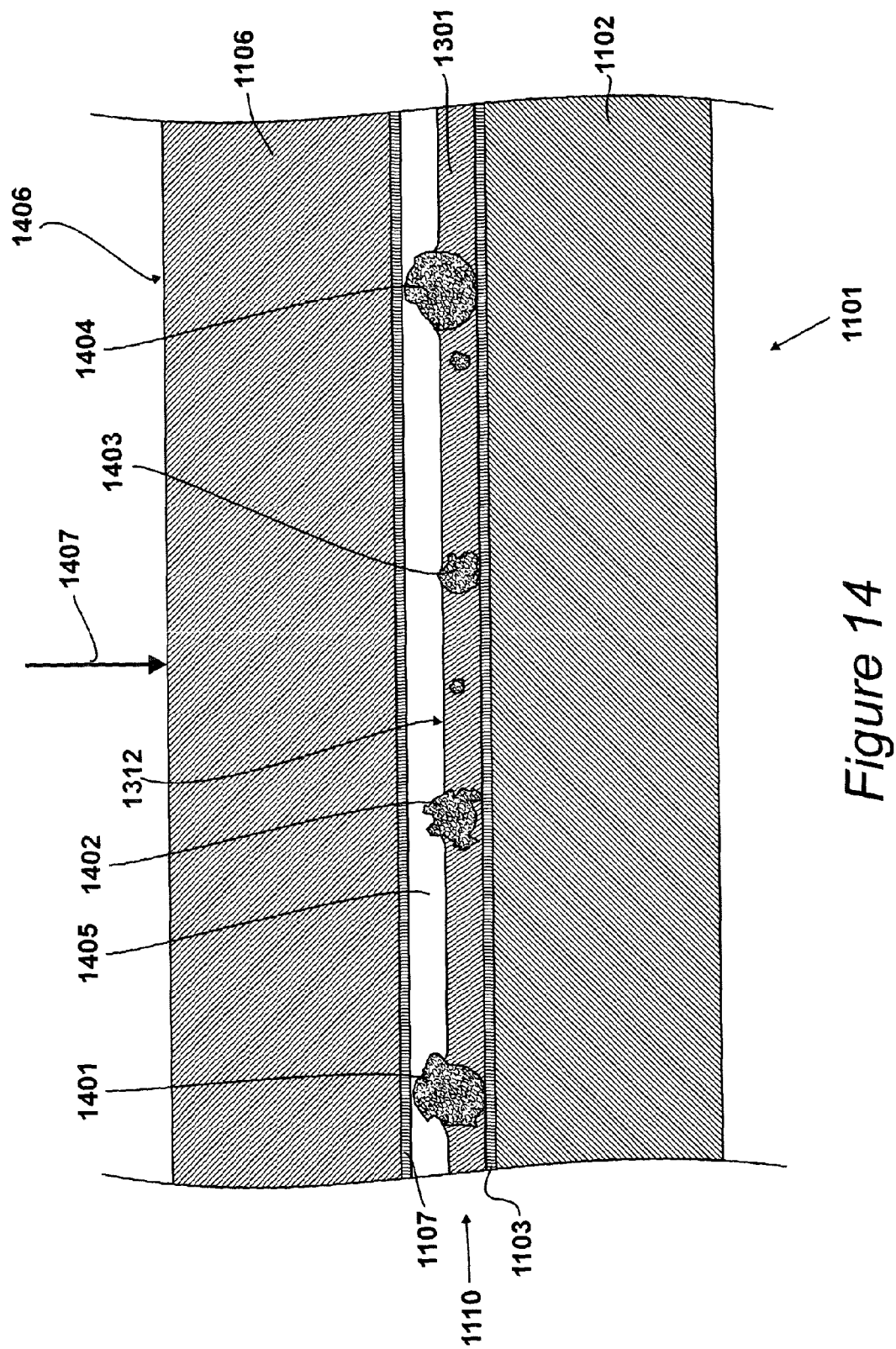
FIG. 14 shows small portion of the position sensing device 1101, in cross-section.

A small portion of the position sensing device 1101 is shown in cross-section FIG. 14. As described above, a first plurality of the agglomerates within the carrier layer have a first dimension, in the direction of the thickness of the carrier layer, that is equal to or greater than the thickness of carrier layer. Four agglomerates 1401, 1402, 1403 and 1404 of this first plurality are illustrated in FIG. 14. Of these four agglomerates, the agglomerates 1401 and 1404 are two of the largest agglomerates with in the electrically responsive composite material and have a first dimension of approximately ten micrometers. As illustrated in FIG. 14, the upper electrically conductive layer 1107 rests on top of the larger agglomerates, including the agglomerates 1401 and 1404, and thus provides an air gap 1405 between the upper surface 1312 of the carrier layer 1301 and the exposed surface of the second electrically conductive layer 1107. Consequently, when no external forces are applied to the position sensor 1101 it is only the largest of the agglomerates, such as agglomerates 1401 and 1404, that are able to provide any conductive path between the electrically conductive layers 1103 and 1107.

If a force is applied to a small area of the upper surface 1406 of the upper sheet 1106, the upper sheet 1106 becomes deformed in the region of the applied force and compresses the larger ones of the agglomerates that are local to the applied force. For example, on application of a force indicated by arrow 1407 in FIG. 14, the upper sheet 1106 in the region of the force 1407 is pressed towards the lower sheet 1102 and the largest agglomerates, such as 1401 and 1404 become compressed, resulting in the conductivity through these agglomerates increasing.

FIG. 15

Figure 15:
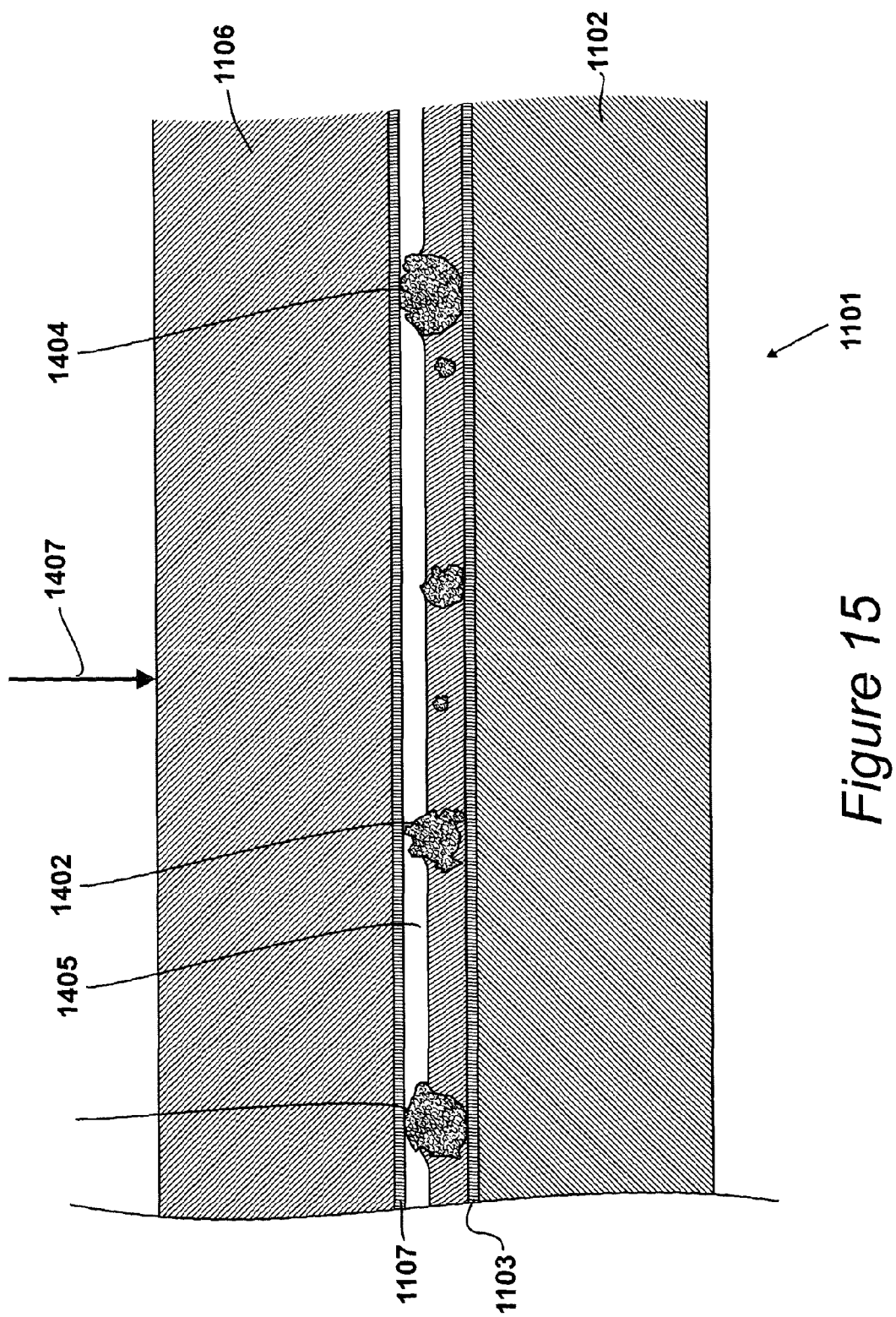
FIG. 15 shows the small portion of the position sensor 1101 (shown in FIG. 14) after the application of a force 1407.

The small portion of the position sensor 1101 shown in FIG. 14 is shown again in FIG. 15 after the application of a force 1407. As illustrated in FIG. 15, the force 1407 has pushed a portion of the sheet 1106 in the facility of the force 1407 towards the lower sheet 1102 such that the air gap 1405 has been reduced and the first dimension of the largest agglomerates 1401 and 1404 has been reduced. Because these largest agglomerates 1401 and 1404 are compressed the electrical conduction through them has been increased. In addition, as illustrated in FIG. 15, because the air gap 1405 has been reduced, the second electrically conductive layer 1107 has been brought into contact with other agglomerates such as agglomerate 1402 that are thus able to provide electrically conductive paths between the first and the second conductive layers 1103 and 1107. Thus, as a force, such as force 1407, is increased conduction between the two electronically conductive layers 1103 and 1107 increases due to a reduction in resistance for each of the agglomerates that is being compressed and also due to additional agglomerates, such as agglomerate 1402, that are brought into contact with the second conductive layer 1107.

Figure 16:
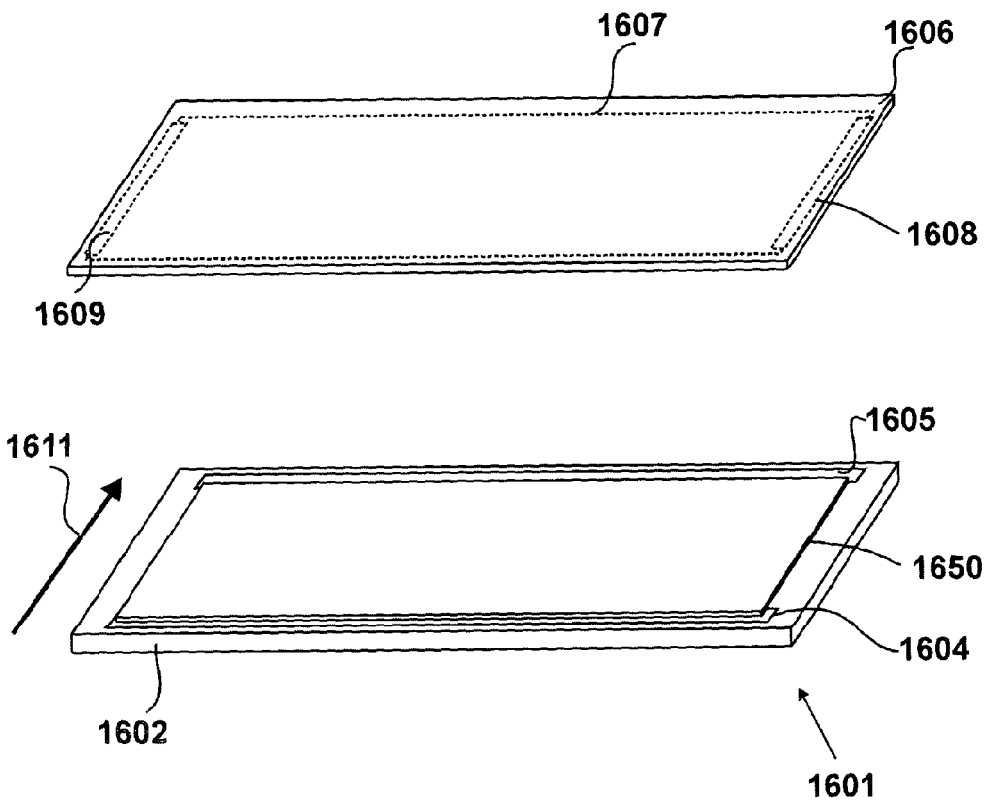
FIG. 16 shows an exploded view of another position sensing device 1601.
Figure 17:
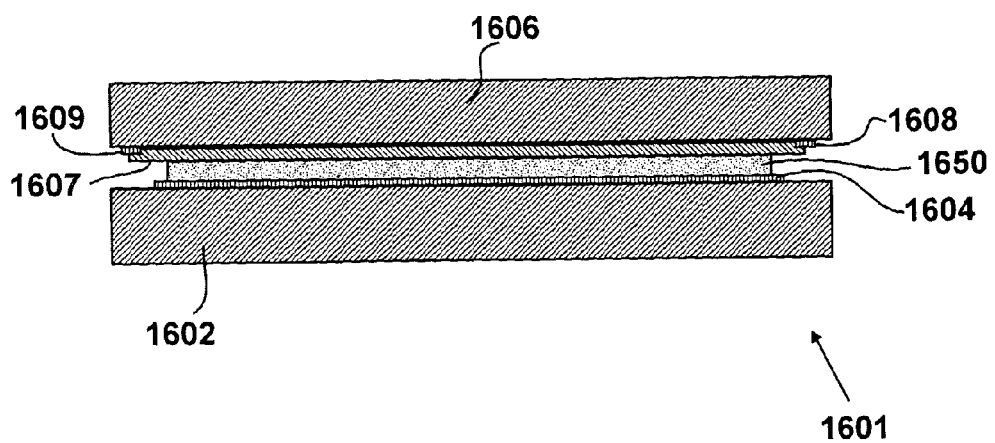
FIG. 17 shows cross-sectional view of the position sensing device 1601.

FIGS. 16 and 17

An alternative position sensing device 1601 embodying the present invention is shown in the exploded view of FIG. 16 and the cross sectional view of FIG. 17. As was the case with FIG. 12, the illustration of FIG. 17 has been greatly stretched in order to show the various layers of the position sensing device 1601.

The position sensing device 1601 has an upper sheet 1606 on which a conductive layer 1607 (of ITO) is provided, along with highly conductive strips 1608 and 1609. Thus, the upper sheet 1606 is substantially identical to the upper sheet 1106 of position sensing device 1101.

In addition, the position sensing device 1601 has a lower insulating sheet 1602, similar to sheet 1102, and similarly having highly conductive strips 1604 and 1605. However, the lower sheets 1602 differs from the lower sheet 1102 of position sensing device 1101 in that it does not have an electrically conductive layer formed of indium tin oxide. Instead, a layer of electrically responsive composite material 1650 has been applied (by screen printing) directly onto the lower sheet 1602, such that it extends between the highly conductive strips 1604 and 1605.

The electrically responsive composite material 1650 has a similar form to the electrically conductive composite material 1110 described above, and therefore it comprises agglomerates of smaller conductive particles dispersed within a carrier layer. However, unlike the carrier layer 1301 of electrically conductive composite material 1110, the electrically responsive composite material 1650 has a carrier layer that is itself electrically conductive, being formed of a conductive polymer; in the present case poly(3,4-ethylenedioxythiophene) poly(styrenesulfonate) (PEDOT/PSS).

The position sensing device 1601 operates in a similar manner to position sensing device 1101. However, in this instance, the carrier layer of the electrically conducting composite material 1650 provides the first conductive layer for providing electrical conduction along the layer, in direction of arrow 1611, while the agglomerates within the carrier layer provide conduction between the carrier layer and the conductive layer 1607 on the upper sheet 1606.

What we claim is:

1. An electrically responsive composite material, comprising:
  a carrier layer having a length extending in a first direction and a width extending in a second direction and a thickness extending in a third direction, said thickness being relatively small compared to said length and said width; and
  a plurality of electrically conductive or semi-conductive particles, said particles being agglomerated to form a plurality of agglomerates dispersed within the carrier layer such that each said agglomerate comprises a plurality of said particles,
  wherein each said agglomerate has a first dimension in said third direction, that is equal to or longer than said thickness of said carrier layer, such that
  each said agglomerate by itself is arranged to provide a path of electrical conduction across the thickness of said carrier layer in response to applied pressure such that said electrically responsive composite material has a resistance that reduces in response to applied pressure.

2. The electrically responsive composite material of claim 1, in which the largest dimension of each of said plurality of agglomerates is smaller than 40 micrometers.

3. The electrically responsive composite material of claim 1, in which the largest dimension of said plurality of agglomerates is smaller than 15 micrometers.

4. The electrically responsive composite material of claim 1, in which the largest dimension of each of said plurality of agglomerates is greater than 5 micrometers.

5. The electrically responsive composite material of claim 1, in which said carrier layer comprises electrically conductive material such that said carrier layer is conductive in the directions of the length and the width of said layer.

6. The electrically responsive composite material of claim 1, in which said carrier layer comprises a polymer.

7. The electrically responsive composite material of claim 6, in which said polymer is transparent.

8. The electrically responsive composite material of claim 1, in which said agglomerates comprise further particles formed of a dielectric material.

9. A position sensing device comprising:
   the electrically responsive composite material of claim 1;
   a first conductive layer that is electrically conductive along said layer; and
   a second conductive layer that is electrically conductive along said layer;
   wherein said agglomerates are arranged to provide conduction between said first conductive layer and said second conductive layer.

10. The position sensing device of claim 9, wherein the first dimension of said first plurality of agglomerates is longer than said thickness of said carrier layer, and said second conducting layer rests against a plurality of said first plurality of agglomerates to provide a gap between said second conducting layer and said carrier layer.

11. The position sensing device of claim 9, wherein said carrier layer comprises electrically conductive material such that said carrier layer is conductive in the directions of the length and the width of said carrier layer, and said carrier layer provides said first conductive layer.

12. The position sensing device of claim 9, wherein said first conductive layer is transparent and formed on a first transparent substrate, said second conductive layer is transparent and formed on a second conductive substrate, and said carrier layer is transparent, so that said position sensing device is transparent.

* * * * *